Nov. 18, 1952     R. VESTRE     2,618,291
CONTROL VALVE FOR HYDRAULIC DRIVE TRANSMISSIONS
Filed Jan. 8, 1947     2 SHEETS—SHEET 1
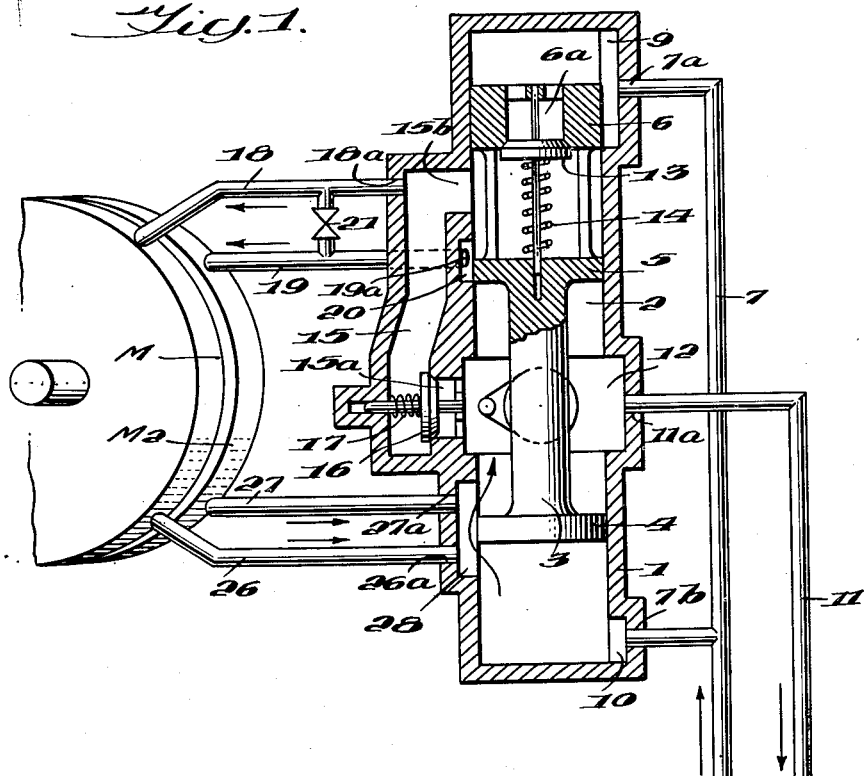
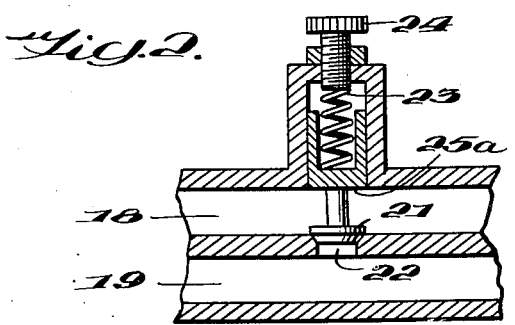
INVENTOR
RASMUS VESTRE,
BY John E. Eastlack
ATTORNEY

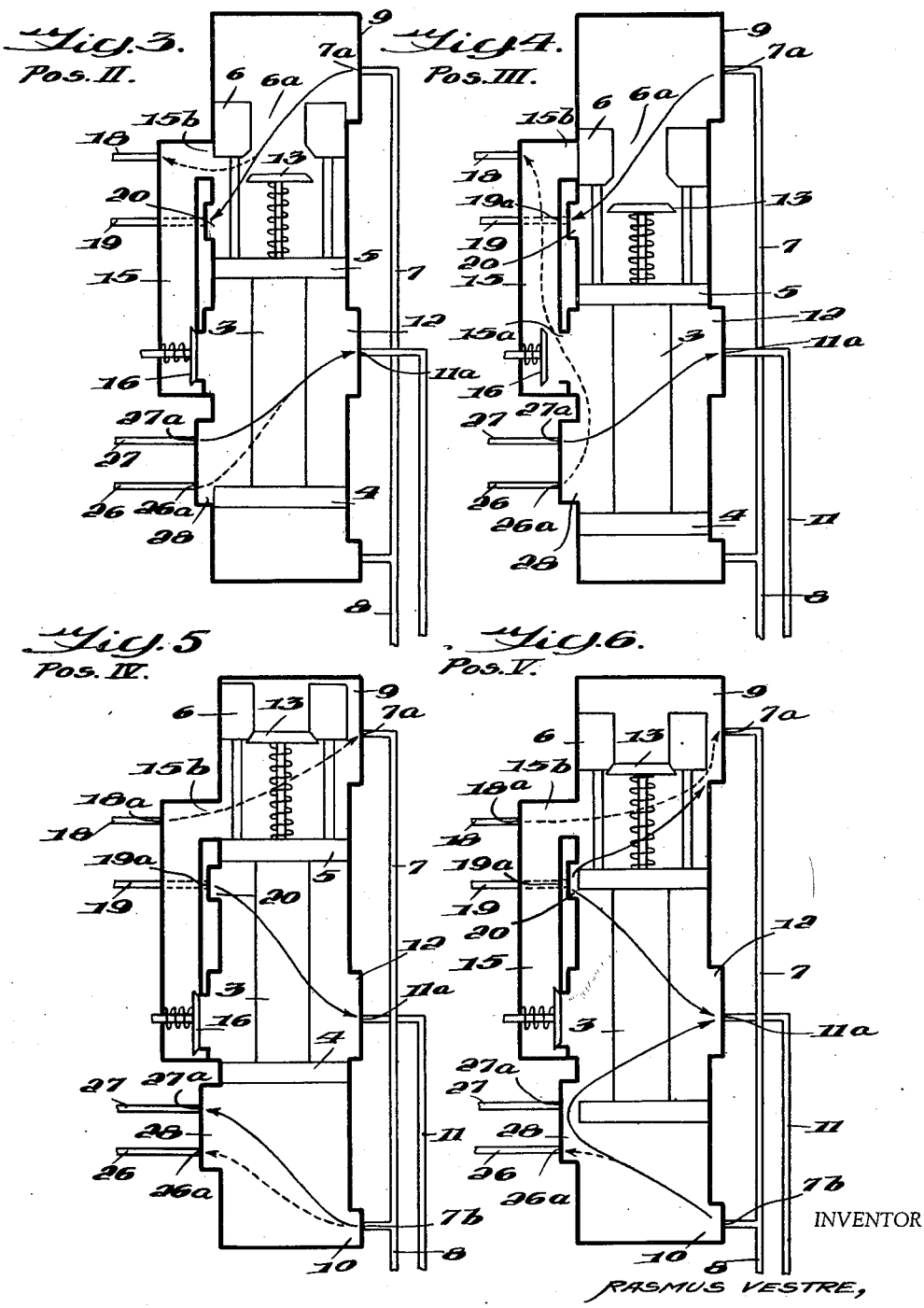

Patented Nov. 18, 1952

2,618,291

UNITED STATES PATENT OFFICE 2,618,291

CONTROL VALVE FOR HYDRAULIC DRIVE TRANSMISSIONS

Rasmus Vestre, Oslo, Norway, assignor to Hydraulik A/S, Brattvag, Norway

Application January 8, 1947, Serial No. 720,885
In Norway May 2, 1946

6 Claims. (Cl. 137—621)

United States patent application, Serial No. 664,950 of April 25, 1946, relates to a control valve for hydraulic transmissions with a hydraulic pump which is operated by a driving motor and a hydraulic motor which is connected in a liquid circuit in series with the pump, a control valve being provided in the liquid circuit for the purpose of regulating the energy which is delivered to the hydraulic motor.

The known types of such control valves usually comprise a valve member slidable axially within a valve housing to which liquid conduits to and from the hydraulic pump and hydraulic motor, respectively, are connected, each of the conduits to and from the said motor having a by-pass in the wall of the valve housing.

The characteristic feature of the present invention is the combination with known control valves such as those heretofore referred to, of one or more one way valves, each of which prevents the flow of liquid from the hydraulic motor along the conduit in which the valve is located when said valve member is moved axially in the housing into a position for stopping the hydraulic motor.

The present invention relates to a modification of this control valve for driving two hydraulic motors, which are coupled to a main shaft. One new feature of the invention is that the valve is provided with delivery and return pipes for each hydraulic motor, and that the delivery pipe to one motor by the action of the valve member may be cut off from the pressure (delivery) pipe from the pump, so that only the other motor is driven and the first motor is idling and driven as a pump, circulating its liquid from the return (discharge) pipe through a by-pass conduit, wherein a non-return valve is arranged, and further through the delivery pipe back to the motor.

A further new feature resides in a pressure responsive relief valve between the delivery pipes to both motors, which valve will permit overflow of the liquid from one of the delivery pipes to the other when the valve member is placed in such a position that a predetermined difference of pressure in the delivery pipes is exceeded.

Further characteristic features of the present invention will be described in the following.

One embodiment of the invention is schematically illustrated upon the annexed drawing, wherein:

Fig. 1 is a vertical section through the control valve showing also both hydraulic motors and the pipes to the control valve and the pump;

Fig. 2 is a vertical section through the safety valve, which is placed between the delivery pipes to both motors; and Figs. 3 to 6 are schematic views showing the circulation of the liquid through the valve with the slidably adjustable valve member 3 adjusted to its various positions.

Upon the annexed drawing $M_1$ and $M_2$ indicate the two hydraulic motors, which are coupled to a main shaft.

The reference numeral 1 indicates the valve housing, the interior of which is formed as a cylinder 2, wherein is a slidably movable valve member 3, provided with pistons 4, 5 and 6. The valve member is moved by a handle not shown upon the drawing, by the aid of which all necessary adjustments are effected on the control valve. The upper and lower ends of the cylinder 2 communicate through a pipe 7, into which the charge pipe 8 from the hydraulic pump (not shown) is connected. The pipe 7 connects with the upper and lower portions, respectively, of the cylinder 2 through ports $7a$ and $7b$ that open through recesses 9 and 10, respectively.

Approximately at the middle of the cylinder the return pipe 11 to the pump is connected, the cylinder having a recess 12 peripherally around the cylinder at this point of connection, and the pipe 11 having a port $11a$ opening into said recess.

In combination with the valve member there is a one way valve 13 acting against a seat in the piston 6 and held by a spring 14 to normally close a passage $6a$ through the piston. The valve is arranged in such a manner that it will open when pressure is applied from the pipe 7 through the recess 9, but is immediately closed when this pressure is cut off or a greater pressure is applied to the valve from the opposite side.

From the recess 12 there is a passage $15a$ opening into a by-pass conduit 15 which leads back to the cylinder somewhat higher up, opening thereinto through a passage $15b$. In this conduit there is a one way valve 16 which is held against its seat by a spring 17 to close the conduit 15 to the passage $15a$. This valve opens by pressure of liquid admitted to the passage $15a$ through the recess 12 but will close again as soon as this pressure is cut off or a greater pressure is applied from the opposite side.

The pipes to the motors $M_1$ and $M_2$ are indicated by the reference numbers 18 and 19. The pipe 18 is connected to the upper part of the conduit 15 and the pipe 19 is connected to the cylinder 2 somewhat below the upper end of the conduit 15 through a recess 20. The pipes 18 and 19 have ports 18a and 19a opening thereinto, respectively. Between the pipes 18 and 19 there is a one way pressure responsive relief valve 21, a detail of which is shown upon Fig. 2 of the drawing and whose object is to prevent overloading of the motor $M_2$. The valve acts against a seat in a bore 22 between the pipes 18 and 19 and is held by a spring 23, the pressure of which may be adjusted by a screw 24 extending into a cylindrical guide 25. The guide 25 provides a shoulder 25a on the valve stem and the diameter of the cylindrical guide is chosen in a certain proportion to the diameter of the bore 22, so that after the valve is opened by a predetermined pressure thereon, the pressure is transmitted to a greater area to hold the valve open so the liquid may pass through the bore 22 without obstruction.

The return pipes from the motors $M_1$ and $M_2$ to the control valve are indicated by the numbers 26 and 27. Both these are connected to the lower part of the cylinder 2 through ports 26a and 27a opening into a recess 28 in the wall of the cylinder.

The device operates in the following manner:

1. When the valve member 3 is in the position shown upon the drawing (Fig. 1), the liquid flows from the pipe 8 through the lower delivery pipe 7 past the piston 4, through the recess 28 and further through the return pipe 11 back to the pump. The recess 9 is then blocked by the piston 6 and both motors are at rest.

2. When the valve member 3 is moved somewhat downwards in the cylinder, the piston 4 will block the recess 28 from below and the liquid consequently will flow through the pipe 7 and recess 9 into the upper part of the cylinder. The one way valve 13 will be moved from its seat and the liquid will flow through both pipes 18 and 19 to the motors $M_1$ and $M_2$ and supply them according to their capacity. The liquid returns to the pump through the pipes 26 and 27 from the motors and further through the pipe 11 back to the pump. Both motors are now parallel-coupled in series with the pump and giving their greatest combined torque.

3. When the valve member is moved further downwards in the cylinder, so that the piston 6 will block the passage 15b into the cylinder 2 (block the pipe 18), all the liquid will flow through the pipe 19 to the motor $M_2$, which then will be driven alone with correspondingly greater speed of rotation. The motor $M_1$ will then be running without load and driven as a pump, circulating its liquid practically without pressure through the pipe 26, the one way valve 16, the conduit 15, the pipe 18 and back to the motor $M_1$. Both motors will thereby obtain increased speed of rotation, but power will be transmitted only through motor $M_2$.

In position III (see Figure 4) of the valve member it will be seen that there are two fluid circuits one of which is associated with and drives the motor $M_2$ and the other of which is associated with the idling motor $M_1$. The latter circuit is closed by the piston 6 covering the port 15b, the suction action produced in the motor $M_1$ creating a drop in pressure in the conduit 15 and pipe 18 which maintains the one way valve 16 open. Thus the amount of liquid leaving the motor $M_1$ through pipe 26 is equivalent to the amount of liquid entering said motor through pipe 18.

If the valve member 3 should be moved back from position III to position II, the operating pressure of the liquid from the pump will be re-established in the conduit 15, with the result that the valve 16 will be closed and the operation of the system will then be as described above.

In addition to the neutral and two driving positions of the control valve above described, the direction of rotation of the motors can be reversed. This is done by raising the valve member 3 from the position shown in Figure 1 until the piston 4 closes communication between the recess 28 and the return pipe 11, and the piston 5 closes the recess 20 from the port 15b and from the recess 9 (position IV). The motor $M_2$ will then alone be driven by the pump, the liquid flowing from pipe 8 to recess 28, through pipe 27, motor $M_2$, pipe 19, and recess 20 back to the return pipe 11. At the same time the motor $M_1$ will be running substantially without pressure, circulating liquid in a closed circuit through pipe 18, port 15b, recess 9, the upper part of the liquid delivery pipe 7, back to the cylinder through recess 10, thence through recess 28 and pipe 26 to motor $M_1$, this liquid circuit holding the valves 13 and 16 closed.

As thus far described the system may be used for driving a mechanism of any kind but where it is to be used in connection with the raising and lowering of loads such, for example, as in the case of an anchor winch, the liquid in the pipes 18, 19 will be under pressure when the valve member is in the position shown in Figure 1. The valve 13 will then be closed and the load will be suspended at rest. The valve 13 may be omitted if the system is not intended to be used in this way.

For controlled lowering of a load the valve member 3 is moved to position V which is between that shown in Figure 1 and position IV. In this position V the lower end of the piston 6 is clear of the lower end of the recess 9, while the piston 5 is located so that liquid can flow from one side thereof to the other through the recess 20. The upper edge of the piston 4 is also clear of the upper edge of the recess 28 so that the liquid can flow through said recess from one side of said recess to the other. In this position of the valve member the suspended load tends to drive the motors as pumps and a part of the pressure liquid entering the cylinder through the recess 10 passes through the recess 28 and returns to the pump through the pipe 11. The remainder of the pressure liquid entering the recess 28 is divided, some of it passing through pipe 26 to motor $M_1$ thence through pipe 18, port 15b, recess 9, and the upper part of the supply pipe 7 back to port 10 in a closed circuit, and the other part passing through pipe 27 to motor $M_2$ and thence through pipe 19 to recess 20. When this latter part of the pressure liquid leaves the recess 20 some of it passes through the recess 9 into the pipe 7 so that it rejoins the liquid passing through the motor 1, while the remainder discharges through the pipe 11. By adjusting the position of the valve member so that the clearance between the lower end of the piston 6 and the lower end of the recess 9 becomes smaller or greater, a larger or smaller quantity of liquid by-passes the piston 5 and returns to the pump through the pipe 11, a correspondingly smaller or larger part of the liquid traversing the closed circuit through the motors. Thus the speed at which the load is lowered can be adjusted simply by varying the position of the valve member between positions I and IV.

If in position III of the valve member the motor $M_2$, which is the sole driving motor, should become over-loaded, the pressure of liquid within the pipe 19 will be increased so as to overcome the pressure of the spring 23 and thus open the valve 21. The liquid traversing the pipe 19 will then be divided and a part thereof will pass through the pipe 18 into the motor M₁ and drive the latter in exactly the same way as if the valve member 3 were in position II. Since the shoulder 25a of the valve guide 25 has a greater effective area than that of the back of the valve 21, the pressure liquid passing through the passage 22 will also act on said shoulder and hold the valve 21 open until the valve member 3 is returned to position II. The valve 21 will then automatically close.

What I claim is:

1. A control valve for hydraulic drive transmission systems comprising a housing provided with a valve chamber and having an admission port for the admission of fluid from a constant pressure source, a fluid discharge port, two main delivery ports adapted for connection to the intake ports of two hydraulic driving motors, two return ports adapted for connection to the exhaust ports of said driving motors, and a secondary delivery port, all of said ports opening into the valve chamber, said delivery ports and the said admission port being located towards one end of said valve chamber and the said return ports being spaced from the delivery ports towards the other end of said valve chamber, a by-pass conduit connecting said secondary delivery port to one of said main delivery ports, a first one-way valve mounted in said second delivery port and positioned to permit the flow of pressure fluid through said by-pass conduit only from the valve chamber and said secondary delivery port and into said by-pass conduit, a valve member within the valve chamber and having a first opening therein positioned to conduct fluid from the admission port to the delivery ports, a second one-way valve mounted in said valve member and positioned to permit the flow of pressure fluid through said opening from one of the fluid admission ports, said valve member having a second opening therein positioned to permit flow of fluid from the return ports to the discharge port, said valve member being slidably adjustable to at least two different positions in one of which it directs the entering pressure fluid past said second one-way valve and through the first opening in said valve member to both said main delivery ports simultaneously, and in the other position said first opening is positioned to direct the pressure fluid to one only of said main delivery ports at working pressure with the other main delivery port in communication with the return ports through said second opening and said secondary delivery port and first one-way valve and said by-pass conduit.

2. A control valve as claimed in claim 1 wherein the valve chamber has a second admission port and the valve member is movable into another position in which it permits communication through said valve chamber between the second admission port and both said return ports simultaneously for effecting reverse drive of the motors.

3. A control valve as claimed in claim 2 wherein the valve member is movable into a position in which it provides communication through said chamber between one of said admission ports and both said return ports and said discharge port while blocking said delivery ports.

4. A control valve for hydraulic drive transmission systems comprising a housing provided with a valve chamber and having first and second admission ports opening into the chamber for the admission of fluid from a constant pressure source, a fluid discharge port opening into said chamber for returning liquid to said source, two main delivery ports opening into said chamber and adapted for connection to the intake ports of two hydraulic driving motors, two return ports adapted for connection to the exhaust ports of said driving motors, a recess adjacent the return ports opening into said ports and into said chamber, and a secondary delivery port opening into said chamber, said delivery ports and said first admission port being located towards one end of said valve chamber and the second admission port and said return ports being spaced from the delivery ports towards the other end of said valve chamber, a by-pass conduit connecting said secondary delivery port to one of said main delivery ports, a first one-way valve positioned to permit the flow of pressure fluid through said by-pass conduit from the chamber and said secondary delivery port, a valve member having a body slidably mounted within said chamber and including three spaced piston portions for sliding engagement with the wall of the chamber, the body between the piston portions being out of contact with the wall of the chamber to provide first and second openings in said body, one of said piston portions having a passage therethrough leading to the first opening, said first opening being positioned to permit flow of fluid from the first admission port to the delivery ports and the second opening being positioned to permit flow of fluid from the return ports to the discharge port, a second one-way valve carried by the valve member and positioned to permit the flow of pressure fluid through said passage from one of said admission ports, said valve member being slidably adjustable and over one range of positions it admits pressure fluid to the chamber from the second admission port and directs it to said return ports and to said discharge port via said recess, and simultaneously directs fluid from said delivery ports in variable degree to the first admission port, for controlling the motors when they are being driven by the load.

5. A control valve for hydraulic drive transmission systems comprising a housing provided with a bore and having first and second admission ports opening into the bore for the admission of fluid from a constant pressure source, a fluid discharge port opening into said bore for returning liquid to said source, two main delivery ports adapted for connection to the intake ports of two reversible hydraulic driving motors, two return ports adapted for connection to the exhaust ports of said driving motors, a first recess adjacent the return ports opening into said ports and into said bore, a secondary delivery port opening into said bore, and a second recess adjacent one of said main delivery ports opening into such port and said bore, said delivery port and said first admission port being located towards one end of said valve chamber and the second admission port and said return ports being spaced from the delivery ports towards the other end of said valve chamber, a by-pass conduit connecting the secondary delivery port to the other of said main delivery ports, a first one-way valve positioned to permit the flow of pressure fluid through said by-pass conduit from the bore of the housing and said secondary delivery port while preventing the flow of pressure fluid through said by-pass to said secondary delivery port, a valve member having a body slidably mounted within the bore of said housing and including three spaced piston portions for sliding engagement with the wall of the housing, the body between the piston portions being out of contact with the wall of the housing to provide first and second openings in said body, one of said piston portions having a passage therethrough leading to the first opening, said first opening being positioned to permit flow of fluid from the first admission port to the delivery ports and the second opening being positioned to permit flow of fluid from the return ports to the discharge port, a second one-way valve in said passage positioned to permit the flow of pressure fluid therethrough from the first admission port while preventing the flow of fluid through said passage to the first admission port, said valve member being slidably adjustable to five different positions viz, (1) in which the valve member blocks both delivery ports, (2) in which fluid pressure is admitted from the first admission port and first opening to both delivery ports (3) in which fluid pressure is admitted by the valve member through the first opening to only one of the delivery ports, (4) in which fluid pressure is admitted to the return ports from the second admission port beyond one end of the valve member for reverse drive, and (5) in which fluid from the second admission port passes through said first recess to the discharge port and fluid from one of the main delivery ports passes through said second recess restrictively to the first admission port and to the discharge port.

6. A control valve for hydraulic drive transmission systems comprising a housing provided with a valve chamber and having first and second admission ports opening into the valve chamber, one adjacent each of the opposite ends of the chamber, for the admission of liquid from a constant pressure source, a liquid discharge port located between said admission ports and opening into said chamber for returning liquid to said source, two main delivery ports adapted for connection to the intake ports of two reversible hydraulic driving motors, said delivery ports being disposed between the first admission port and said discharge port, two return ports adapted for connection to the exhaust ports of said driving motors and disposed between said second admission port and said delivery ports, a first recess adjacent the return ports opening into said ports and into said chamber, a secondary delivery port opening into said chamber, and a second recess adjacent one of said main delivery ports opening into such port and said chamber, a by-pass conduit connecting the secondary delivery port to the other of said main delivery ports, a one-way valve positioned to permit the flow of pressure liquid through said by-pass conduit from the said chamber and said secondary delivery port while preventing the flow of pressure liquid through said by-pass to said secondary delivery port, a valve member slidably mounted within the bore of said housing and including first, second and third spaced portions for sliding engagement with the wall of the chamber, the valve member between the said portions being out of contact with the wall of the chamber, one of said piston portions having a passage therethrough, a second one-way valve, said second one-way valve being disposed in said passage and positioned to permit the flow of pressure liquid therethrough from the first said admission port while preventing the flow of liquid through said passage to the said first admission port, said passage communicating through said second one-way valve with a space between the first and second portions and between the wall of the valve chamber and the valve chamber, said valve member being slidably adjustable to five different positions viz (1) in which the valve member blocks both delivery ports, the first and second said portions being disposed on opposite sides of the delivery ports, the first portion also blocking the first admission port and the third portion being disposed between the ends of said first recess thereby permitting fluid to flow from the second admission port to the discharge port, (2) in which liquid pressure is admitted from the first admission port through said passage and said second one-way valve and said space to both delivery ports, said return ports communicating between the second and third valve member portions with the discharge port, (3) in which liquid pressure is admitted by the valve member from the first admission port through said passage to only one of the delivery ports, (4) in which liquid pressure is admitted to the return ports for reverse drive, and (5) in which liquid from one admission port passes through said first recess to the discharge port and liquid from one of the main delivery ports passes through said second recess restrictively past said first portion to the other admission port and to the discharge port.

RASMUS VESTRE.

REFERENCES CITED

The following references are of record in the file of this patent:

UNITED STATES PATENTS

| Number | Name | Date |
| --- | --- | --- |
| 1,156,816 | Rich | Oct. 12, 1915 |
| 1,156,817 | Rich | Oct. 12, 1915 |
| 1,590,226 | Boisset | June 29, 1926 |
| 2,184,793 | Clench | Dec. 26, 1939 |
| 2,362,349 | Bryant | Nov. 7, 1944 |
| 2,370,526 | Doran | Feb. 27, 1945 |
| 2,374,714 | Turchan | May 1, 1945 |
| 2,387,307 | Stone | Oct. 23, 1945 |
| 2,391,930 | Stone | Jan. 1, 1946 |